United States Patent
Brauns et al.

(10) Patent No.: US 6,867,155 B2
(45) Date of Patent: Mar. 15, 2005

(54) NON-ABRASIVE COMPOSITE DOCTOR BLADE

(75) Inventors: Allen J. Brauns, Sturbridge, MA (US); Stacey L. Jackson, Holden, MA (US)

(73) Assignee: Kadant Web Systems, Inc., Auburn, MA (US)

( * ) Notice: Subject to any disclaimer, the term of this patent is extended or adjusted under 35 U.S.C. 154(b) by 0 days.

(21) Appl. No.: 10/109,308

(22) Filed: Mar. 28, 2002

(65) Prior Publication Data

US 2002/0174966 A1 Nov. 28, 2002

Related U.S. Application Data

(63) Continuation of application No. PCT/US99/24166, filed on Oct. 15, 1999.

(51) Int. Cl.[7] ................................ B32B 5/26
(52) U.S. Cl. ............... 442/239; 442/246; 442/251; 442/253; 428/293.4; 428/297.4; 162/280; 162/281
(58) Field of Search ............... 442/181, 239, 442/246, 251, 253; 428/293.4, 297.4; 162/280, 281

(56) References Cited

U.S. PATENT DOCUMENTS 2,767,529 A * 10/1956 Scott .................. 451/49
3,847,707 A * 11/1974 Meyer et al. .............. 156/436
4,549,933 A * 10/1985 Judd et al. ................. 162/281
4,735,144 A *  4/1988 Jenkins ...................... 101/464
5,117,264 A *  5/1992 Frankel et al. .............. 399/350

FOREIGN PATENT DOCUMENTS

SU         1694755      * 11/1991    ............ D21G/3/00

OTHER PUBLICATIONS

Database WPI, Section Ch, Week 199404, Derwent Publications Ltd., London, GB; AN 1994–031397, XP002220132 & JP 05338048 A (Teijin Ltd), Dec. 21, 1993, abstract.

Database WPI, Section Ch, Week 198002, Derwent Publications Ltd., London, GB; AN 1980–02479C, XP002220133 & JP 54–149787 A (Ichikawa Keori KK), Nov. 24, 1979, abstract.

* cited by examiner

Primary Examiner—Ula Ruddock
(74) Attorney, Agent, or Firm—Gauthier & Connors

(57) ABSTRACT

A multiplayer composite doctor blade has a side edge configured for application to the surface of a rotating roll in a paper making machine. The doctor blade has an inner core and intermediate layers preferably enclosed by outer layers. The inner core is predominantly polymeric material. The intermediate layers on opposite sides of the core include reinforcing fibers. The side edge of the doctor blade has an abrasiveness as measured by ASTM test method D5181-91 of between about 4.0 to 5.0.

20 Claims, 4 Drawing Sheets

NON-ABRASIVE COMPOSITE DOCTOR BLADE

This application is a: Continuation and hereby claims benefit under 35 U.S.C. §120 to the following applications: Ser. No. PCT/US99/24166 filed Oct. 15, 1999.

BACKGROUND OF THE INVENTION

1. Field of the Invention

This invention relates generally to doctors used in papermaking and web converting machines and is concerned in particular with the provision of a composite doctor blade.

2. Description of the Prior Art

Doctor blades contact the surface of rolls in papermaking and web converting machines for the purpose of cleaning or sheet removal. Conventional doctor blade materials include metals, homogeneous plastics, and cotton, glass and carbon thermoset laminates. Metal blades, although inexpensive, can cause damage or premature wear with some roll surfaces. Many of the water removal rolls on the wet end have a relatively soft rubber cover measured at 10 P&J and softer. Typically, these rolls are doctored with homogeneous plastic doctor blades, such as ultra-high molecular weight polyethylene ("UHMW polyethylene").

Plastic blades are generally thick, ⅛" to ¼", compared to metals and glass and carbon thermoset laminates which are typically 0.050" to 0.080" thick. The additional thickness of the homogeneous plastics is required to achieve sufficient machine-direction rigidity for reliable doctoring. However, when compared to thinner blades, a thick doctor blade suffers a loss in doctoring performance due to the decreased contact pressure between the blade and the roll. Cotton laminates, like homogeneous plastics, are relatively thick and have the associated disadvantages. To eliminate some of the problems associated with thick plastic or cotton blades, glass and carbon laminates are often used. Glass laminates are rigid and can therefore be made thin for efficient doctoring. The main disadvantage with glass laminates is that the glass wear particles produced are abrasive, which can unintentionally alter or cause excessive wear with some roll surfaces, especially soft wet end rolls. Carbon laminates have the advantage of being very rigid and non-abrasive. However, carbon laminates are expensive and not always economical for widespread use in the wet end of the paper machine. Therefore, it was necessary to develop a thin and non-abrasive composite doctor blade to efficiently doctor soft wet end rolls on the paper machine.

Coater blades may be in contact with a moving sheet of paper or other material. At the point of blade contact, the sheet is supported by a rotating coater backing roll. The coater blade is used in a wiping mode to meter a layer of liquid on to a sheet of paper or other material. With some coating machines, the coater blade meters a layer of liquid directly on a roll surface and then the coating is transferred to the sheet of material at a later point. The coater blade is held in a holder similar to a doctor blade. The metered liquid or coating thickness is dependent on the amount of pressure applied to the trailing edge of the coater blade. An increased amount of pressure will decrease the coating thickness. Similarly, a decreased amount of pressure will increase the coating thickness. Conventional coater blade materials include steel, stainless steel and steel with a treated edge for prolonging the useful life.

U.S. Pat. No. 4,5499,933 shows a doctor blade having non-homogeneous stiffness properties. U.S. Pat. No. 2,767,529 shows a polishing doctor blade composed of alternate frangible and wear resisting laminations of mildly abrasive and non-abrasive materials, respectively.

SUMMARY OF THE INVENTION

Briefly, a doctor blade is configured for application to the surface of a rotating roll in a paper making machine. The doctor blade is a multilayer composite having an inner core and intermediate layers on opposite sides of the core. The doctor blade may also include outer layers overlying the intermediate layers. The inner core is predominantly polymeric material which lies on the neutral axis of the blade. The intermediate layers include reinforcing fibers. The side edge of said doctor blade has an abrasiveness as measured by ASTM test method D5181-91 of between about 4.0 to 5.0.

It is the object of the invention to provide a thin, multi-layered doctor or coater blade utilizing both layers of thermoset or thermoplastic material and reinforcing material, bound together with thermoset resin in a sandwich type construction.

Another object of the present invention is to provide a doctor blade which is relatively thin yet has sufficient machine-direction rigidity for efficient doctoring or coating application.

Still yet another objective of the present invention is to provide a non-abrasive blade which is beneficial for both maintaining the roll surface roughness in its original condition and prolonging the roll life.

These and other objectives, features and advantages of the present invention will be apparent in light of the following detailed description of preferred embodiments thereof, as illustrated in the accompanying drawings.

DETAILED DESCRIPTION OF THE INVENTION

Figure 1:
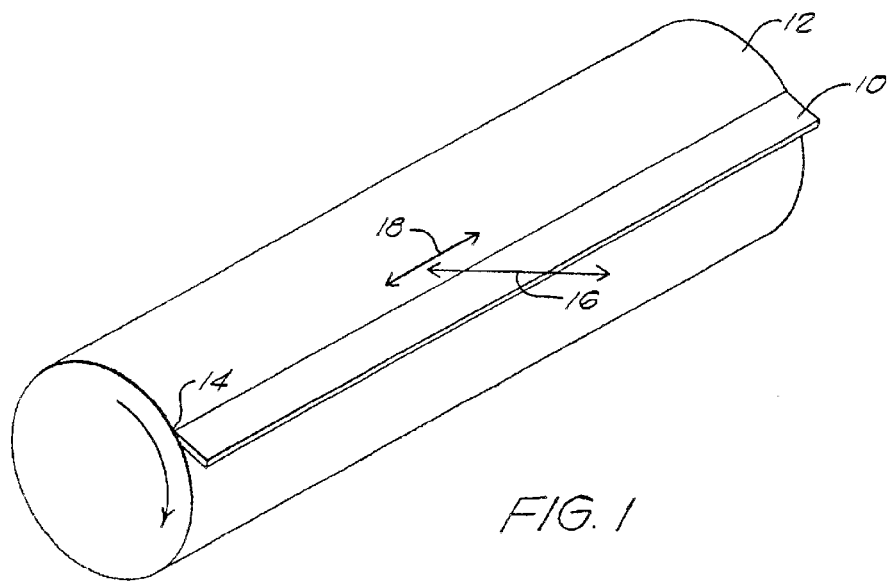
FIG. 1 is a side view of a doctor blade assembly in contact with a rotating roll in accordance with the present invention.
Figure 2:
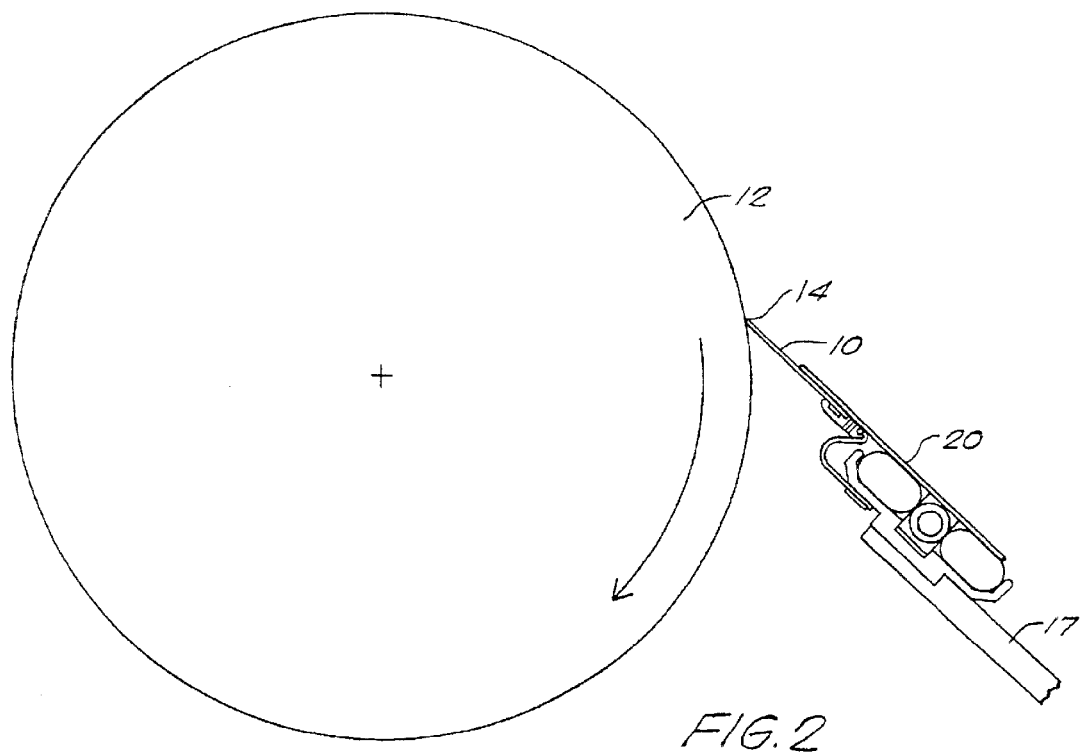
FIG. 2 is a side view of the doctor blade in contact with the rotating roll.

With reference initially to FIG. 1, a doctor blade 10 is shown in contact with a rotating roll 12 for the purpose of cleaning, sheet removal or other similar operations. A leading beveled edge 14 of the doctor blade 10 contacts the surface of the rotating roll 12. The "machine direction" denoted by the arrow 16, is the direction that is perpendicular to the roll axis. The "cross machine direction" denoted by the arrow 18, is the direction parallel to the roll axis. FIG. 2 shows a side view of a doctor assembly which includes an elongated blade 10 and a doctor blade holder 20 attached to a rigid doctor structure 17.

Figure 3:
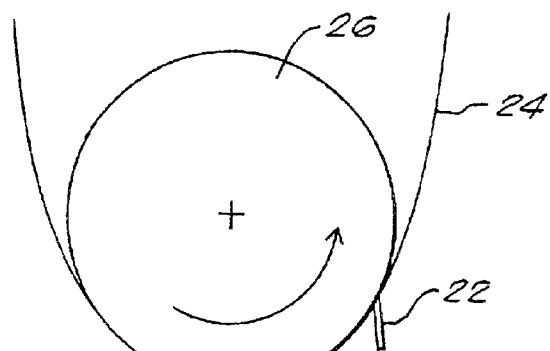
FIG. 3 is a sectional view of a blade in contact with a roll in a wiping mode in a coater application.
Figure 4:
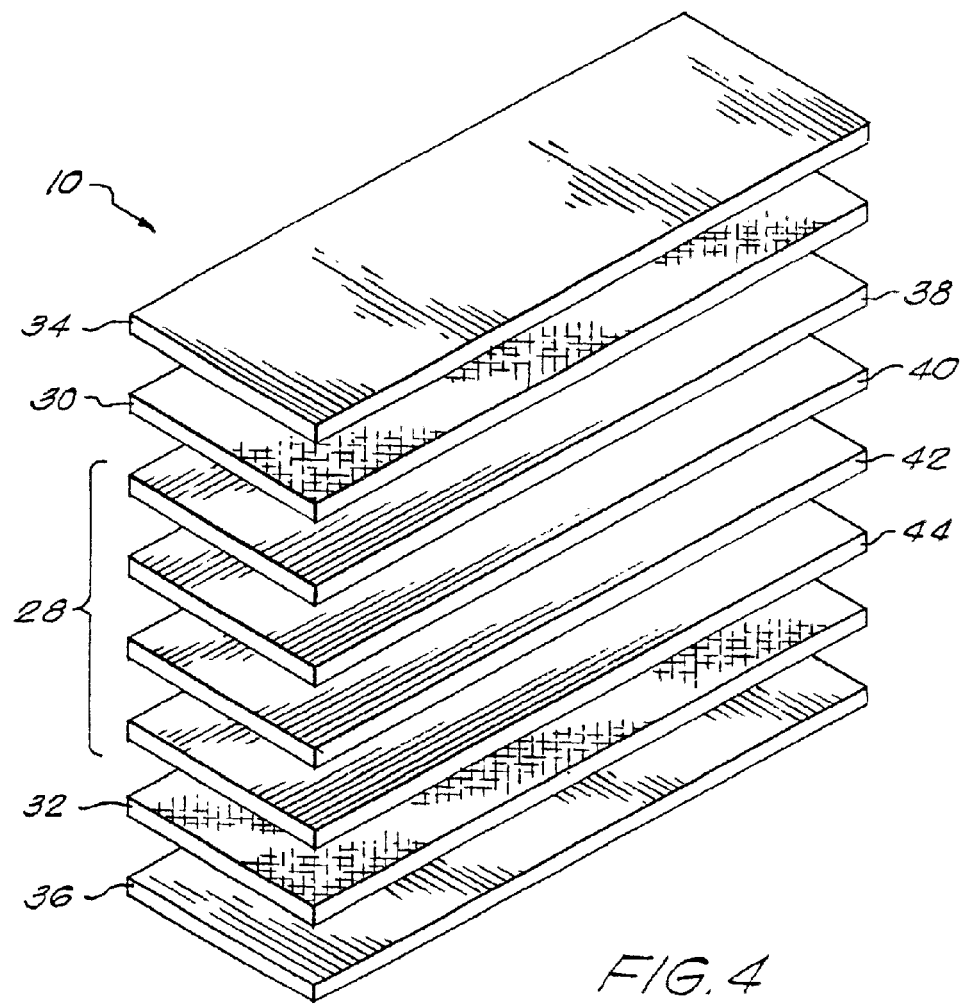
FIG. 4 is an enlarged exploded perspective view of the components of a doctor blade in accordance with the present invention.
Figure 5:
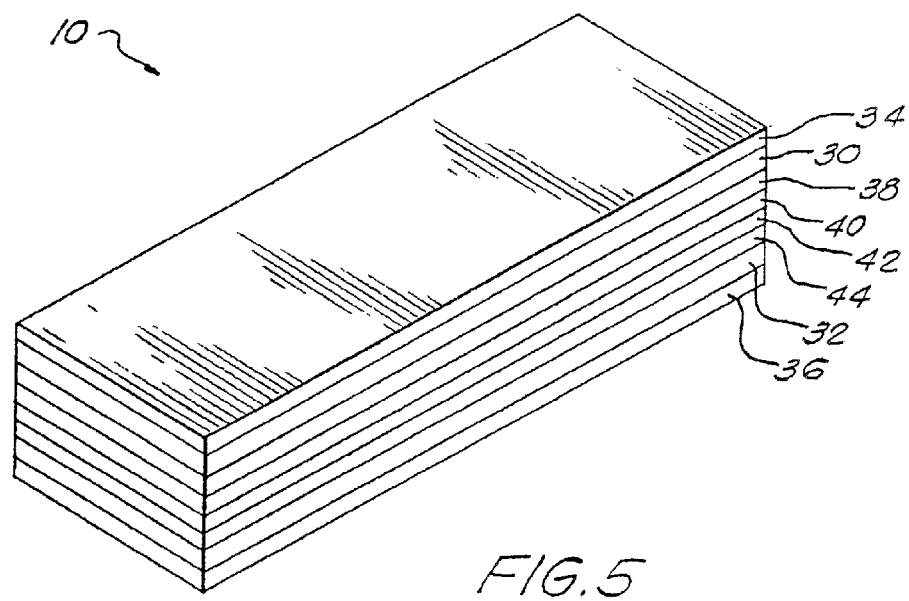
FIG. 5 is a perspective view of the doctor blade of FIG. 4.

FIG. 3 shows a coater blade 22 in contact with a moving sheet of paper or other material 24. At the point of blade contact, the sheet 24 is supported by a rotating coater backing roll 26. The coater blade 22 is used in a wiping mode to meter a layer of liquid on to a sheet of paper or other material 24. The appearance of the coater blade 22 is similar to that of the doctor blade. The invention described throughout relates to both doctor and coater blades. In the description that follows, it is intended that the wording "doctor blade" apply to both doctor and coater blades.

A composite doctor blade 10 in accordance with the present invention is shown in FIGS. 4–7 as comprising multiple layers in a sandwich type construction. The doctor blade 10 consists of an inner core 28 and intermediate layers 30, 32 on opposite sides of the core. The doctor blade 10 may alternatively include outer layers 34, 36 overlying the intermediate layers 30, 32. The layers are mechanically bonded to each other with a resin. The resin may be a thermoset resin such as an epoxy, phenolic, polyester or a polyimide.

Figure 6:
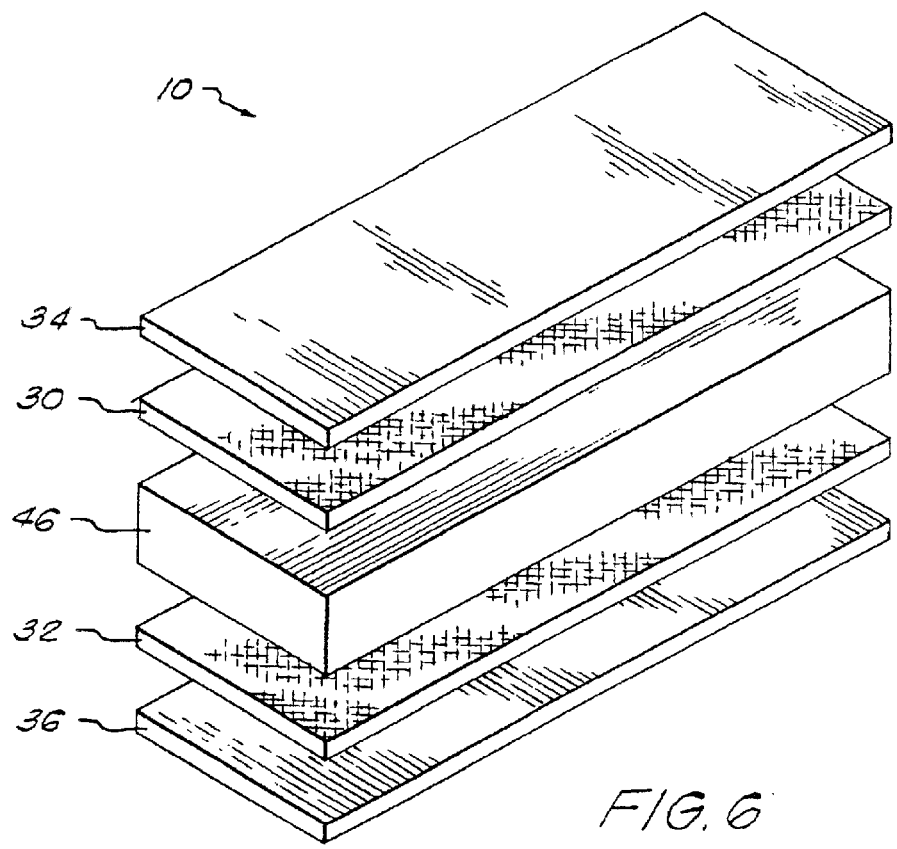
FIG. 6 is an exploded perspective view of an alternative embodiment.

The core 28 can consist of multiple layers indicated by layers 38, 40, 42 and 44, or as a single homogeneous layer 46 as shown in FIG. 6. The core 28 is centered on the neutral axis. The core 28 may consist of individual layers of a woven or non-woven plastic or homogeneous layers of plastic bound together. As an alternative, one or more layers of a reinforcing or high strength material such as carbon may be placed within the core for added strength, stability or wear performance.

The core thickness is in the range of 0.005" to 0.140". The total core thickness required is dependent on the desired total thickness, flexural strength and flexural modulus or rigidity of the desired doctor blade 10. Polymeric materials, specifically thermoset or thermoplastic materials such as polyester, UHMW polyethylene, nylon, Teflon® (tetrafluoroethylene fluorocarbon or "TFE"), aromatic polyamides and other such materials can be used as the core material 28. The core/material 28 is chosen such that it is compatible with the roll surface to be doctored. When selecting the core material 28, the degree to which the core material resists wear and the capability of the core material to wear with a clean sharp edge are important considerations. The core material 28 must also be resistant to attack from any chemicals present, temperature, humidity and the general operating environment.

Intermediate layers 30 and 32 are comprised of reinforcing or high strength fibers and are spaced away from the neutral axis by the core 28. The flexural properties of the finished doctor blade 10 are a function of the distance between layers 30 and 32 and the neutral axis. Intermediate layers 30 and 32 can utilize uni-directional or multi-directional fibers. The thickness and fiber orientation are selected to achieve the desired flexural properties. In the majority of doctoring applications, the machine-direction strength and rigidity of the doctor blade are critical for efficient cleaning of the roll surface and sheet removal. Therefore, the preferred fiber orientation is biased in the machine direction. Carbon is the preferred fiber, however, other fibrous, high strength materials such as Kevlar® an aromatic polyamide fiber, could be utilized. As with the core 28, the intermediate materials must be compatible with the roll surface and the general operating environment.

The outer layers 34, 36 are adjacent to the intermediate layers 30, 32. The outer layers provide a finished appearance on the exposed doctor blade surfaces. The outer layers 34, 36 also serve to keep the intermediate layers 30, 32 bound securely to the core 28. It is preferred that the outer layers 34, 36 be of the same material as the core 28 although a material different than that of the core could also be used. As with the core 28 and the intermediate layers 30, 32, it is important that the outer layer material be compatible with the operating environment.

Figure 7:
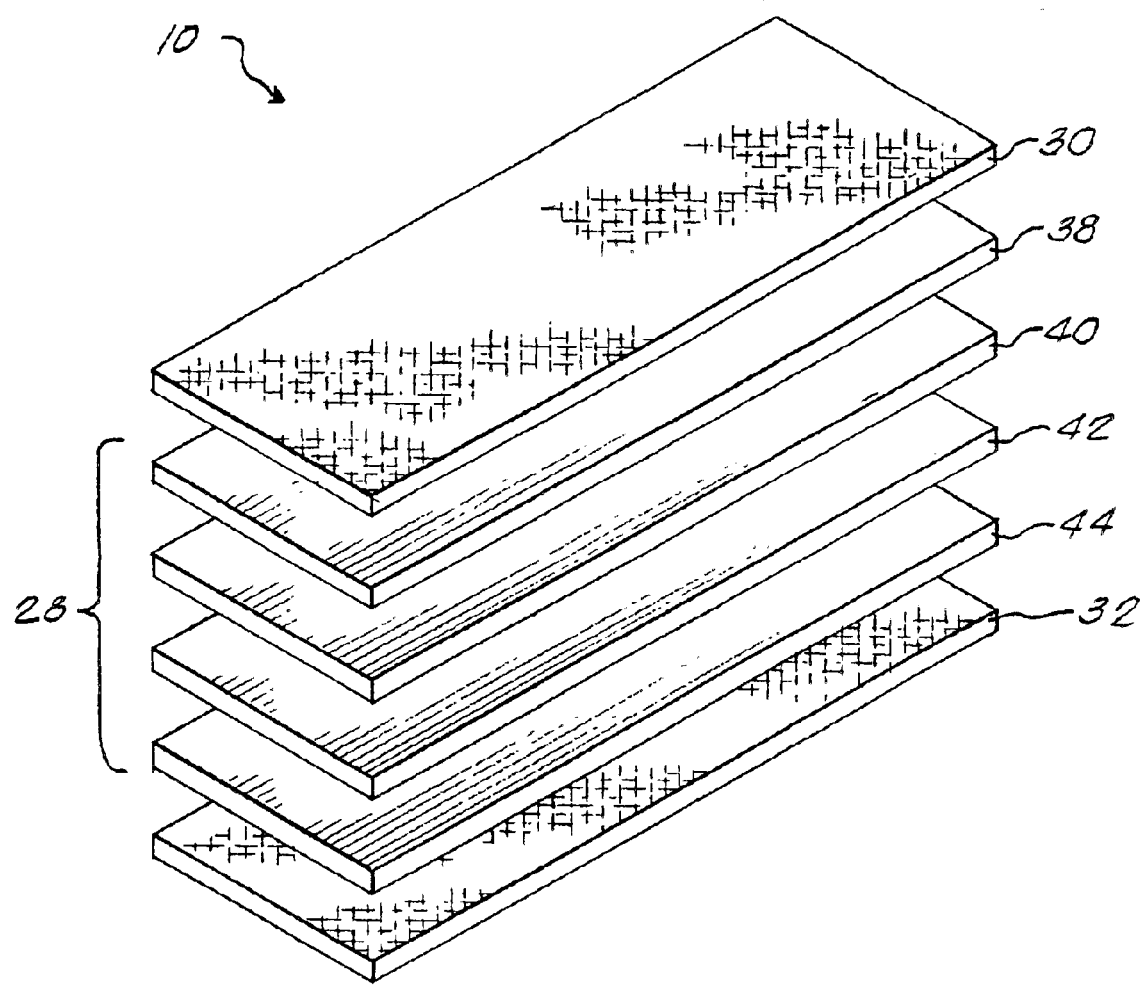
FIG. 7 is an exploded perspective view of another alternative embodiment.

An alternative embodiment is shown in FIG. 7 wherein the doctor blade is constructed without the outer layers 34 and 36 so that the intermediate layers of reinforcing or high strength layers 30 and 32 would be the exposed blade surfaces.

The doctor blade 10 has a thickness ranging from 0.015 to 0.150" and a flexural modulus of between about 40–150× $10^5$ psi (tested according to ASTM test method D-790). A preferred thickness of the blade 10 is 0.050" with a flexural modulus of between 75–100×$10^5$ psi.

The abrasiveness of the doctor blade was tested according to ASTM test method D5181-91. The test is based on a scale of 1–10, 1 being the least abrasive. The doctor blade 10 has an abrasiveness between about 4.0 and 5.0.

EXAMPLE 1

Three different doctor blades were to be tested and compared for abrasivity. Each sample was prepared by aligning and clamping together seven doctor blades of the same material.

Sample 1 was Graflex™, prepared according to U.S. Pat. No. 4,549,933 and including outer layers of woven glass, intermediate layers of unidirectional carbon in the machine direction and a core of woven glass.

Sample 2 was prepared in accordance with the invention and including outer layers of non-woven polyester fibers, intermediate layers of unidirectional carbon in the machine direction, and a core of woven polyester fibers surrounding unidirectional carbon in the cross machine direction Sample 3 was Fiberflex® wherein all layers were woven fiberglass.

In all three samples the materials were bonded with epoxy resin. The blades were approximately 0.050" thick and thus the bundles were approximately 0.350" thick. The blades were tested as bundles to have a larger surface area to test. The abrasiveness of the blades were tested using standard receptors B-2-2(tan) and B-3-2 (blue) with the following results:

Sample 2—4.6
Sample 1—5.3
Sample 3—6.0

The blade prepared according to the invention, Sample 2 was the least abrasive.

The doctor blades are relatively thin yet have sufficient machine-direction rigidity for efficient doctoring or coating application. The materials used in the construction of the blade are non-abrasive in nature. The non-abrasive characteristic is beneficial for both maintaining the roll surface roughness in its original condition and prolonging roll life when the roll surface to be doctored is relatively soft. Also, in doctoring or coating applications with a lubricating liquid present, the use of plastic combined with carbon helps to lengthen the useful life of the blade by reducing the wear rate.

Although the present invention has been shown and described with respect to several preferred embodiments thereof, various changes, omissions and additions to the form and detail thereof, may be made therein, without departing from the spirit and scope of the invention

We claim:

1. An elongated doctor blade having a side edge configured for application to the surface of a rotating roll in a paper making machine, said doctor blade being a multilayer composite comprising:

a) an inner core of predominantly polymeric material lying on the neutral axis of said blade; and b) intermediate layers on opposite sides of said core, said intermediate layers including reinforcing fibers, the side edge of said doctor blade having an abrasiveness as measured by ASTM test method D5181-91 of between about 4.0 to 5.0.

2. The doctor blade as claimed in claim 1 further characterized by a machine direction flexural modulus of between about $40-150 \times 10^5$ psi.

3. The doctor blade as claimed in claim 2 wherein the machine direction flexural modulus is between about $75-100 \times 10^5$ psi and the thickness of said doctor blade is approximately 0.050".

4. The doctor blade as claimed in claim 1 wherein said inner core comprises a single homogeneous layer.

5. The doctor blade as claimed in claim 1 wherein said inner core comprises a plurality layers.

6. The doctor blade as claimed in claim 4 or 5 wherein said polymeric material is a woven fabric.

7. The doctor blade as claimed in claim 5 wherein said inner core includes layers reinforced with a high strength material.

8. The doctor blade as claimed in claim 7 wherein said high strength material is selected from the group consisting of carbon or aromatic polyamides.

9. The doctor blade as claimed in claim 1 wherein said polymeric material is thermoplastic or thermoset.

10. The doctor blade as claimed in claim 9 wherein said polymeric material is selected from the group comprising polyester, UHMW polyethylene, nylon, polytetrafluoroethylene, or aromatic polyamides.

11. The doctor blade as claimed in claim 1 wherein said inner core has a thickness ranging from about 0.005 to 0.140 inches.

12. The doctor blade as claimed in claim 1 wherein said doctor blade has a thickness ranging from about 0.015 to 0.150 inches.

13. The doctor blade as claimed in claim 1 wherein said doctor blade preferably has a thickness of approximately 0.050 inches.

14. The doctor blade as claimed in claim 1 wherein said layers are mechanically bonded to each other with a resin.

15. The doctor blade as claimed in claim 1 wherein said resin is a thermoset resin.

16. The doctor blade as claimed in claim 15 wherein said thermoset resin is selected from the group consisting of epoxy, phenolic, polyester and polyimides.

17. The doctor blade as claimed in claim 1 wherein said reinforcing fibers are oriented in the machine direction.

18. An elongated doctor blade having a side edge configured for application to the surface of a rotating roll in a paper making machine, said doctor blade being a multilayer composite comprising:

a) an inner core of predominantly plastic material lying on the neutral axis of said blade;

b) intermediate layers on opposite sides of said core, said intermediate layers including reinforcing fibers; and c) outer layers overlying said intermediate layers, the side edge of said doctor blade having an abrasiveness as measured by ASTM test method D5181-91 of between about 4.0 to 5.0.

19. The elongated doctor blade as claimed in claim 18 wherein said outer layers are the same material as the core layers.

20. The elongated doctor blade as claimed in claim 18 wherein said outer layers are selected from the group comprising polyester, UHMW polyethylene, nylon, polytetrafluoroethylene or aromatic polyamides.

* * * * *